United States Patent [19]

Graham

[11] 4,355,920
[45] Oct. 26, 1982

[54] CLAMP-TO-BULKHEAD ADAPTERS FOR PUSH PULL CABLE END FITTINGS

[75] Inventor: Dennis I. Graham, Hudson, Ohio

[73] Assignee: Incom International Inc., Pittsburgh, Pa.

[21] Appl. No.: 199,802

[22] Filed: Oct. 23, 1980

[51] Int. Cl.³ ............................................. F16B 9/00
[52] U.S. Cl. .................................. 403/195; 74/501 R
[58] Field of Search ............... 403/197, 201, 195, 194, 403/196; 74/501 R, 501 P

[56] References Cited

U.S. PATENT DOCUMENTS

| | | | |
|---|---|---|---|
| 2,519,812 | 8/1950 | Arens | 74/501 |
| 2,550,670 | 5/1951 | Brickman | 74/501 |
| 3,429,197 | 2/1969 | Loewenstern | 74/501 P UX |
| 3,893,776 | 7/1975 | Beattie | 403/195 X |

FOREIGN PATENT DOCUMENTS 946629  1/1964  United Kingdom ............... 403/197

*Primary Examiner*—Andrew V. Kundrat
*Attorney, Agent, or Firm*—James C. Wray

[57] ABSTRACT

Apparatus is provided for adapting the clamp-type end fitting of a push-pull cable assembly to a bulkhead-type fitting. Identical semi-cylindrical castings form a sleeve on the cable assembly. The castings are offset axially with respect to each other. Ridges formed on the inner surfaces of the castings cooperate to engage an annular groove formed in the cable assembly and thereby hold the sleeve on the cable assembly. Two nuts threaded onto the outer surface of the sleeve mount the assembly to a wall or bulkhead.

19 Claims, 5 Drawing Figures

U.S. Patent  Oct. 26, 1982  4,355,920
FIG. 1
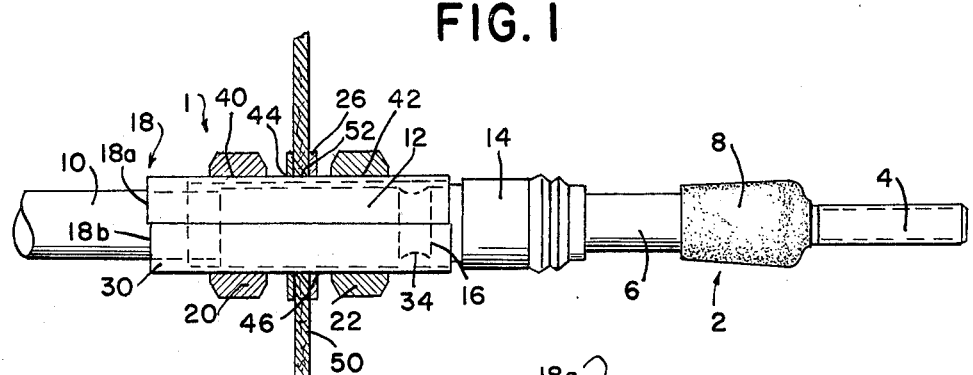
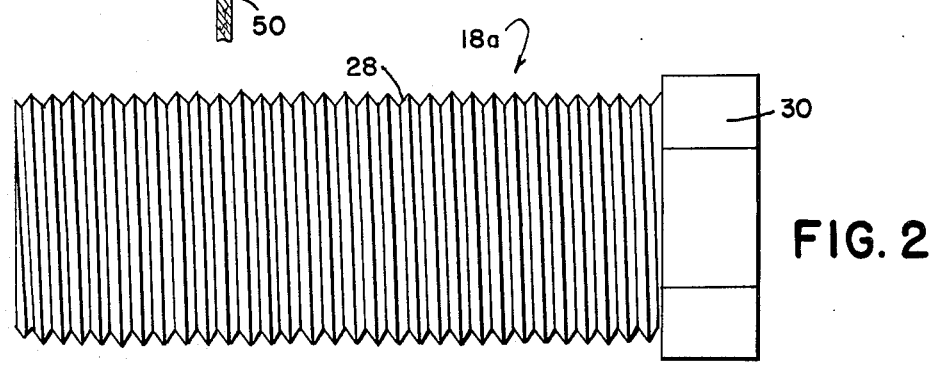
FIG. 2
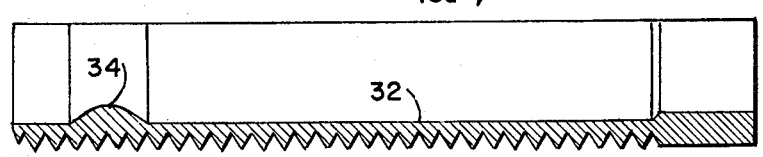
FIG. 3
FIG. 5
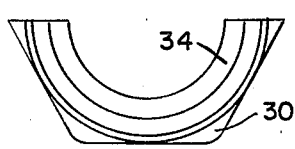
FIG. 4
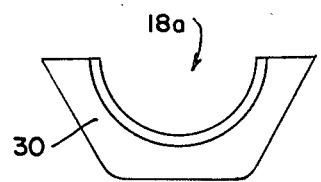

CLAMP-TO-BULKHEAD ADAPTERS FOR PUSH PULL CABLE END FITTINGS

BACKGROUND OF THE INVENTION

This invention relates generally to end fitting adapters and more particularly has reference to a device useful in adapting a cable end from a clamp fitting to a bulkhead fitting.

Pertinent United States and foreign patents are found in Class 248, subclass 56; Class 279, subclasses 8, 87, and 89; Class 339, subclasses 94A, 125R, 126R, 126J, 126RS, 129, 130 and 138, and Class 403, subclasses 310, 311 and 313. of the official classifications of patents in the United States Patent and Trademark Office.

Examples of pertinent patents are U.S. Pat. Nos. 2,766,471; 2,557,472; 3,005,037 and 2,704,357.

U.S. Pat. No. 2,766,471 discloses a double end inserted scraper and handle. The handle has two identical semi-cylindrical portions that form a hollow bore when fitted together. The opposite ends of the portions are threaded to engage two nuts used to hold the portions together.

U.S. Pat. No. 3,005,037 discloses an electric through-wall outlet. A pipe piece, threaded on each end, is used to support a wire through a wall. A nut on each side of the wall is used to engage the ends of the pipe, securing the pipe to the wall.

U.S. Pat. No. 2,704,357 discloses an electrical jack. A hollow threaded mounting sheath is used to support a terminal plug in a wall. The sheath has a bolt-like configuration. Accordingly, only one end of the sheath need be threaded to mount the sheath in a wall.

U.S. Pat. No. 2,557,472 discloses a pump rod crosshead assembly that uses a split sleeve with threaded ends.

SUMMARY OF THE INVENTION

The present invention is a new concept in clamp-to-bulkhead adapters. It provides the same mounting dimensions as a standard bulkhead cable and thus allows a clamp cable to be used in a bulkhead configuration without additional modification.

In preferred form, the invention provides two identical semi-cylindrical castings, two nuts, and two washers. The castings are arranged on the clamp cable assembly to form a sleeve. Because the castings are identical, they must be offset axially with respect to each other in order to align the screw threads on their outer surfaces. Ridges formed on the inner surfaces of the castings engage an annular groove in the clamp cable assembly to hold the sleeve on the assembly. The castings are held together by the nuts which are positioned on opposite sides of the bulkhead to which the cable is to be mounted. The washers are interposed between the nuts and the bulkhead.

OBJECTS OF THE INVENTION

An object of the invention is to provide an improved clamp-to-bulkhead adapter which has the same mounting dimensions as a standard bulkhead cable.

Another object of the invention is to provide a clamp-to-bulkhead adapter which has two identical sleeve segments.

Yet another object of the invention is to provide an adapter having a ridge which engages a clamping groove formed in the cable assembly to hold the adapter on the assembly.

A further object of the invention is to provide a clamp-to-bulkhead adapter for mounting a push-pull clamp cable assembly on a bulkhead comprising semi-cylindrical sleeve segments having outer surfaces and inner surfaces, fastener receiving means connected to the outer surfaces for receiving fasteners, annular ridges connected to the inner surfaces, said ridges cooperating to engage an annular groove on clamp cable assembly, and fastener means connected to the fastener receiving means for securing the adapter portions to the clamp cable assembly.

These and other and further objects and features of the invention are apparent in the disclosure which includes the above and below specifications and claims and drawings.

BRIEF DESCRIPTION OF THE DRAWINGS

FIG. 1 is a side elevational view, partly in section, of a clamp-to-bulkhead adapter embodying the features of the present invention.

FIG. 2 is a side elevational view of a sleeve segment.

FIG. 3 is a longitudinal cross-section of the sleeve segment shown in FIG. 2.

FIG. 4 is an end elevational view of the sleeve segment shown in FIG. 3.

FIG. 5 is another end elevational view of the sleeve segment shown in FIG. 3.

DETAILED DESCRIPTION OF THE DRAWINGS

Referring to FIG. 1, a clamp-to-bulkhead adapter 1 embodying the features of the present invention is shown mounted on a push-pull clamp cable assembly 2 inserted through an opening 52 in a wall or bulkhead 50.

The clamp cable 2 comprises an actuator rod 4 slidably mounted in a swivel sleeve 6. The rod 4 is the relatively long rigid member which is customarily crimped to the end of a flexible core and used to communicate axial forces to the core. An actuator rod seal 8 mounted on the swivel sleeve 6 protects the swivel sleeve 6 and the actuator rod 4. Cable conduit 10 terminates in a cylindrical clamp hub 12 which is connected to the swivel sleeve 6 and sleeve seal 14. An annular groove 16 is formed in the clamp hub 12.

The clamp-to-bulkhead adapter 1 comprises a sleeve assembly 18, hex nuts 20 and 22 and washers 44 and 26.

The sleeve assembly 18 comprises two identical sleeve segments 18A and 18B. One of the segments 18A is shown in detail in FIGS. 2-5. Sleeve segment 18A is a semi-cylindrical casting. The outer surfaces 46 of the segments 18A and 18B a threaded longitudinal portion 28 and a faceted end portion 30. The end portion 30 facilitates handling and installation of the sleeve segment 18A. The inner semi-cylindrical surface 32 of the sleeve segment 18A has a semi-annular ridge 34 which is a half thread narrower than the annular groove 16 formed in the clamp hub 12.

The hex nuts 20 and 22 have threaded inner surfaces 40 and 42 which are configured to matingly engage the threaded outer surface of the sleeve assembly 18. The washers 44 and 26 must be large enough to extend across the bulkhead opening 52 receiving the clamp cable assembly 2 with the clamp-to-bulkhead adapter 1.

The adapter assembly 1 is installed on the clamp cable assembly 2 as follows:

The sleeve seal 14 is removed from the clamp hub 12 and allowed to rest on the swivel sleeve 6. A hex nut 20 and washer 44 are then worked over the sleeve seal 14.

The sleeve segments 18A and 18B are installed on the clamp hub 12 by registering the semi-annular ridges in the annular groove 16. The segments 18A and 18B are translated axially with respect to each other to align the screw threads on their outer surfaces. When the proper alignment is achieved, the sleeve segments 18A and 18B will be offset axially with respect to each other as shown in FIG. 1.

The sleeve segments 18A and 18B are clamped in place by threading the hex nut 20 onto the longitudinal portion of the sleeve assembly 18. The washer 44 is positioned adjacent to the hex nut 20.

This assembly is then installed through a wall or bulkhead 50. A washer 26 and hex nut 22 are worked over the hub seal 14 and installed on the sleeve assembly 18. The hex nut 22 is adjusted to bring the washers 44 and 26 into abutment with the wall or bulkhead 50.

While the invention has been described with reference to a specific embodiment, the exact nature and scope of the invention is defined in the following claims.

What is claimed is:

1. A clamp-to-bulkhead adapter for mounting a clamp cable assembly on a bulkhead comprising
   a segmented cylindrical sleeve having an outer surface and an inner surface,
   fastener receiving means on the outer surface for detachably receiving fasteners.
   arcuate ridge on the inner surface for detachable registration in a pre-formed clamping groove on the clamp cable assembly, and
   fastener means detachably receivable by the fastener receiving means for securing the sleeve about the cable assembly with the ridge in registration with the clamping groove.

2. The apparatus of claim 1 wherein the clamping groove is formed in a clamping hub in the clamp cable assembly.

3. The apparatus of claim 1 wherein the sleeve comprises identical sleeve segments.

4. The apparatus of claim 1 wherein the sleeve comprises plural sleeve segments each provided with a ridge segment for detachable registration in said clamping groove.

5. The apparatus of claim 1 wherein the ridge is an annular ridge and the clamping groove is an annular groove.

6. The apparatus of claim 1 wherein
   the fastener receiving means comprises screw threads, and
   the fastener means comprises nuts having threaded inner surfaces configured to detachably engage the screw threads.

7. The apparatus of claim 6 wherein the clamping groove is about a half thread wider than the ridge segments to allow the sleeve segments to be offset axially with respect to each other.

8. The apparatus of claim 1 wherein
   the fastener receiving means comprises screw threads, and
   the fastener means comprises a pair of nuts having threaded inner surfaces configured to detachably engage the screw threads, the nuts being positioned on opposite sides of the bulkhead for attaching the cable assembly to the bulkhead.

9. The apparatus of claim 8 further comprising washers positioned between the nuts and the bulkhead.

10. A clamp-to-bulkhead adapter for mounting a push-pull clamp cable assembly on a bulkhead comprising:
    semi-cylindrical sleeve segments having outer surfaces and inner surfaces, screw threads formed on the outer surfaces for receiving nuts,
    annular ridges connected to the inner surfaces, said ridges cooperating to engage an annular groove in the cable assembly, and
    nuts having threaded inner surfaces configured to detachably engage the screw threads for securing the sleeve segments to the cable assembly, wherein
    the annular groove is about a half thread wider than the annular ridge, thereby allowing the sleeve segments to be offset axially with respect to each other.

11. The apparatus of claim 10 wherein the semi-cylindrical sleeve segments are identical.

12. A clamp-to-bulkhead adapter for mounting a push-pull clamp cable assembly on a bulkhead comprising:
    semi-cylindrical sleeve segments having outer surfaces and inner surfaces,
    fastener receiving means connected to the outer surfaces for receiving fasteners,
    annular ridges connected to the inner surfaces, said ridges cooperating to engage an annular groove in the cable assembly, and
    fastener means connected to the fastener receiving means for securing the sleeve segments to the cable assembly, wherein
    the sleeve segments are offset axially with respect to each other.

13. A clamp-to-bulkhead adapter for mounting a clamp cable assembly on a bulkhead comprising
    a segmented cylindrical sleeve having an outer surface and an inner surface, said sleeve comprising identical sleeve segments offset axially with respect to each other,
    screw threads formed annularly about the outer surface for detachably engaging nuts, and
    nuts having threaded inner surfaces configured to detachably engage the screw threads for securing the sleeve about the cable assembly.

14. The apparatus of claims 1 or 13 wherein the sleeve provides the same mounting dimensions as a standard bulkhead cable.

15. The apparatus of claims 1 or 13 wherein the sleeve comprises semi-cylindrical sleeve segments.

16. The apparatus of claims 1 or 13 further comprising
    gripper means connected to the outer surfaces for holding the sleeve.

17. The apparatus of claim 16 wherein the gripper means comprises a faceted end portion of the sleeve.

18. The apparatus of claim 4 wherein the clamping groove is wider than the ridge segments to allow the sleeve segments to be offset axially with respect to each other.

19. The apparatus of claims 18 or 7 wherein the clamping groove is an annular groove and the ridge segments define an annular ridge.

* * * * *